United States Patent
Lee

(10) Patent No.: US 10,043,392 B2
(45) Date of Patent: Aug. 7, 2018

(54) SENSING APPARATUS FOR VEHICLE, SENSING METHOD FOR VEHICLE AND CONTROL APPARATUS FOR VEHICLE

(71) Applicant: MANDO CORPORATION, Pyeongtaek-si, Gyeonggi-do (KR)

(72) Inventor: Hyung Jik Lee, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 157 days.

(21) Appl. No.: 15/237,638

(22) Filed: Aug. 16, 2016

(65) Prior Publication Data

US 2017/0061797 A1    Mar. 2, 2017

(30) Foreign Application Priority Data

Aug. 26, 2015  (KR) ........................ 10-2015-0119957

(51) Int. Cl.
| | |
|---|---|
| *G06F 19/00* | (2018.01) |
| *G08G 1/16* | (2006.01) |
| *B60K 31/00* | (2006.01) |
| *B60Q 9/00* | (2006.01) |
| *B60T 8/1755* | (2006.01) |

(52) U.S. Cl.
CPC ......... *G08G 1/165* (2013.01); *B60K 31/0008* (2013.01); *B60K 31/0075* (2013.01); *B60Q 9/008* (2013.01); *B60T 8/17551* (2013.01); *B60T 8/17557* (2013.01); *B60T 8/17558* (2013.01); *G08G 1/167* (2013.01); *B60K 2031/0016* (2013.01); *B60T 2210/24* (2013.01)

(58) Field of Classification Search
CPC .... G08G 1/165; G08G 1/167; B60K 31/0008; B60K 31/0075; B60K 2031/0016; B60Q 9/008; B60T 8/17551; B60T 8/17557; B60T 8/17558; B60T 2210/24
USPC ....................................................... 701/1, 70
See application file for complete search history.

(56) References Cited

U.S. PATENT DOCUMENTS

| | | | | |
|---|---|---|---|---|
| 9,315,194 | B2 * | 4/2016 | Okuda | B60W 50/12 |
| 2005/0080542 | A1 * | 4/2005 | Lu | B60G 17/0185 |
| | | | | 701/70 |
| 2005/0253738 | A1 * | 11/2005 | Kobayashi | B60Q 1/085 |
| | | | | 340/988 |

* cited by examiner

*Primary Examiner* — Ronnie M Mancho
(74) *Attorney, Agent, or Firm* — Hauptman Ham, LLP

(57) ABSTRACT

The present invention provides a sensing apparatus for a vehicle, the apparatus including: a sensing unit that is configured to sense at least one of vehicle speed information, yaw rate information, and steering angle information, and to sense a forward object existing within a sensing distance set in advance; a calculator that is configured to calculate at least one of a driving curvature radius, which is calculated based on the vehicle speed information and the yaw rate information, and a steering angular speed, which is calculated based on the steering angle information; and an adjusting unit that is configured to adjust the sensing distance to be decreased when the driving curvature radius is less than, or equal to, a predetermined curvature radius or when the steering angular speed is less than, or equal to, a predetermined angular speed.

18 Claims, 9 Drawing Sheets

SENSING APPARATUS FOR VEHICLE, SENSING METHOD FOR VEHICLE AND CONTROL APPARATUS FOR VEHICLE

CROSS REFERENCE TO RELATED APPLICATION

This application claims priority from Korean Patent Application No. 10-2015-0119957, filed on Aug. 26, 2015, which is hereby incorporated by reference for all purposes as if fully set forth herein.

BACKGROUND OF THE INVENTION

1. Field of the Invention

The present invention relates to a sensing technology for vehicles and a control technology for vehicles.

2. Description of the Prior Art

A vehicle is equipped with sensors to sense a foreign object existing in front of the vehicle, in a lateral side of the vehicle, and behind the vehicle.

The sensors are essential to execute a passive operation that provides a driver with information associated with an object existing in a blind spot that is not shown from a driver's seat, and to execute an active operation that informs a user of collision risk and further prevents or avoids an accident that may inevitably occur.

Also, in addition to the active operation that prevents or avoids an accident, the sensors are used for a driving assistance system (DAS) which provides convenience to the drivers, for example, a lane keeping assist system (LKAS), a lane change assist system, a smart cruise control system (SCCS), and the like.

However, to completely execute the above described active operation, the sensors that are installed in a vehicle to sense a foreign object need to actively operate by taking the road environment into consideration.

Alternatively, to completely execute the above described active operation, a threshold distance that determines an operation needs to actively change by taking the road environment into consideration.

However, when a vehicle drives through an alley where a parked vehicle exists in a wayside, an existing sensing technology for vehicles and an existing control technology for vehicles may determine that there is a collision risk due to the parked vehicle even though there is no actual collision risk, and the above described driving assistance system may operate, which is a drawback.

SUMMARY OF THE INVENTION

In this background, an aspect of the present invention is to provide a sensing technology for vehicles, which actively adjusts a sensing distance based on an external environment where a vehicle drives through, and to provide a control technology for vehicles, which actively adjusts a threshold distance that determines an operation, based on the external environment.

In accordance with an aspect of the present invention, there is provided a sensing unit for a vehicle, the apparatus including: a sensing apparatus that is configured to sense at least one of vehicle speed information, yaw rate information, and steering angle information, and to sense a forward object existing within a sensing distance set in advance; a calculator that is configured to calculate at least one of a driving curvature radius, which is calculated based on the vehicle speed information and the yaw rate information, and a steering angular speed, which is calculated based on the steering angle information; and an adjusting unit that is configured to adjust the sensing distance to be decreased when the driving curvature radius is less than, or equal to, a predetermined curvature radius or when the steering angular speed is less than, or equal to, a predetermined angular speed.

In accordance with another aspect of the present invention, there is provided a sensing method for a vehicle, the method including: sensing at least one out of vehicle speed information, yaw rate information, and steering angle information, and sensing a forward object existing within a predetermined sensing distance; calculating at least one of a driving curvature radius, which is calculated based on the vehicle speed information and the yaw rate information, and a steering angular speed, which is calculated based on the steering angle information; and adjusting the sensing distance when the driving curvature radius is less than, or equal to, a predetermined curvature radius or the steering angular speed is less than, or equal to, a predetermined angular speed.

In accordance with another aspect of the present invention, there is provided a control apparatus for a vehicle, the apparatus including: a sensing unit that is configured to sense at least one out of vehicle speed information, yaw rate information, and steering angle information, and to sense a forward object existing within a predetermined sensing distance; a calculator that is configured to calculate at least one out of a driving curvature radius, which is calculated based on the vehicle speed information and the yaw rate information, and a steering angular speed, which is calculated based on the steering angle information; an adjusting unit that is configured to adjust a threshold distance to be decreased when the driving curvature radius is less than, or equal to, a predetermined curvature radius or the steering angular speed is less than, or equal to, a predetermined angular speed; and a controller that is configured to control a notification device or a brake device when a distance to the forward object is less than the threshold distance.

As described above, according to embodiments of the present invention, there may be provided a sensing technology for vehicles, which actively adjusts a sensing distance based on an external environment, and to provide a control technology for vehicles, which actively adjusts a threshold distance that determines an operation, based on the external environment.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
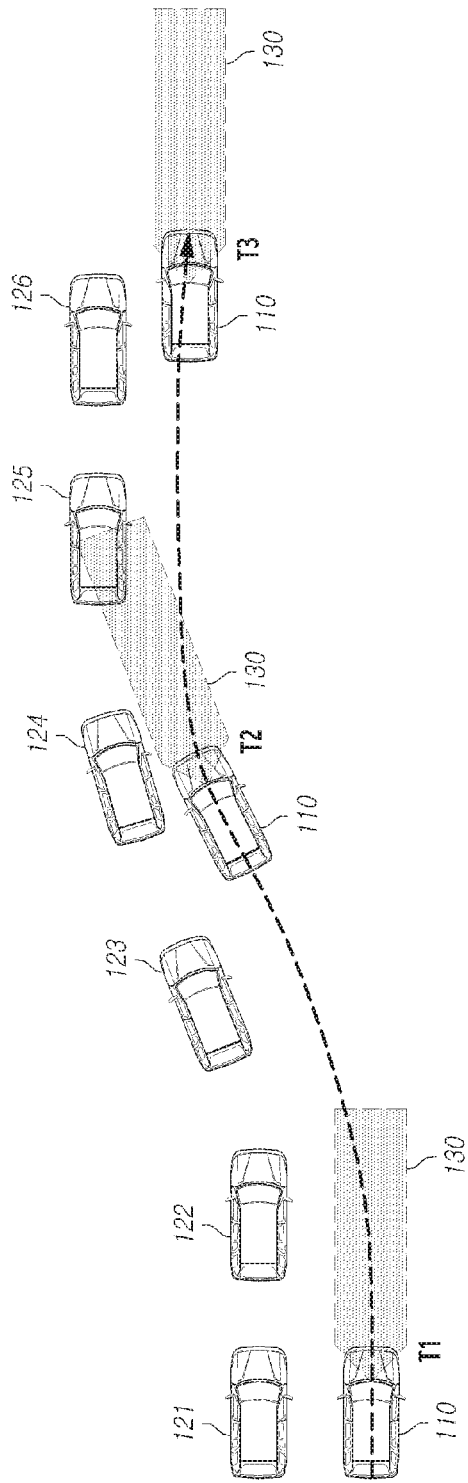
FIG. 1 is a diagram illustrating an example that describes operations of a general sensing apparatus for a vehicle.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may be connected to", "be coupled to", or "be in contact with" the structural elements as well as that the certain structural element is directly connected to or is in direct contact with another structural element.

FIG. 1 is a diagram illustrating an example that describes operations of a general sensing apparatus for a vehicle.

FIG. 1 illustrates a situation in which a driving vehicle 110 equipped with a general sensing apparatus for a vehicle drives through a road where a parked vehicle 121 to 126 exists in a wayside at a predetermined time (T1, T2, and T3).

Under the situation of FIG. 1, the general sensing apparatus for a vehicle may sense an object existing with in a predetermined sensing distance 130, irrespective of a circumstance where the driving vehicle 110 drives through. Through the above described operation, the general sensing apparatus senses a parked vehicle 125 at T2.

When the general sensing apparatus for a vehicle senses the parked vehicle 125 at T2, a steering control device and a brake control device that are installed in the driving vehicle 110 may execute undesired operations. The steering control device and the brake control device may be included in a driving assistance system (DAS) that recognizes that collision risk exists when the sensing apparatus senses an object, and operates a steering device and a brake so as to avoid a collision.

That is, although the driving vehicle 110 normally drives in a given environment at T2 and there is no collision risk, it is determined that there is collision risk since the parked vehicle 125 is sensed due to the fixed sensing distance 130, and the steering control device and the brake control device operate, which is a drawback.

As described above, although the driving vehicle 110 normally drives, the driving assistance system that includes a steering control device, a brake control device, and the like, operates undesirably since a given situation is not taken into consideration, which is a drawback. A sensing apparatus for a vehicle, a sensing method for a vehicle, and a control apparatus for vehicle will be described in detail with reference to FIGS. 2 to 7, FIG. 8, and FIG. 9, which overcomes the drawback.

Figure 2:
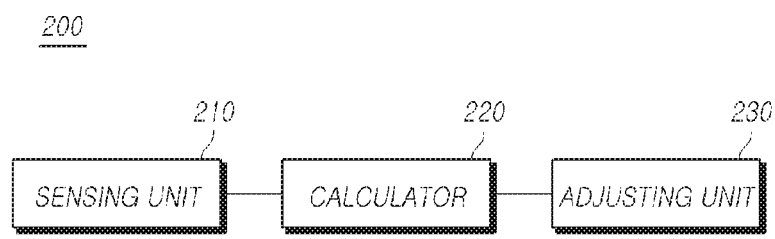
FIG. 2 is a diagram illustrating a configuration of a sensing apparatus for a vehicle according to an embodiment of the present invention.

FIG. 2 is a diagram illustrating a configuration of a sensing apparatus for a vehicle according to an embodiment of the present invention.

Referring to FIG. 2, a sensing apparatus 200 for a vehicle according to an embodiment of the present invention may include: a sensing unit 210 that senses at least one of vehicle speed information, yaw rate information, and steering angle information, and senses a forward object existing within a predetermined sensing distance; a calculator 220 that calculates at least one of a driving curvature radius, which is calculated based on the sensed vehicle speed information and the yaw rate information, and a steering angular speed, which is calculated based on the sensed steering angle information; and an adjusting unit 230 that adjusts a sensing distance to be decreased when the calculated driving curvature radius is less than, or equal to, a predetermined curvature radius or the calculated steering angular speed is less than, or equal to, a predetermined angular speed.

The sensing unit 210 may sense the vehicle speed information using a vehicle-mounted sensor that is capable of sensing a vehicle speed, wherein the vehicle-mounted sensor may include, for example, a speed sensor, a wheel speed sensor, and the like.

The speed sensor may include, for example, a reed switch-based speed sensor that senses a vehicle speed by generating an ON or OFF signal a number of times that is proportional to the vehicle speed by a reed switch or by being mounted to a portion adjacent to a rotatable magnet in a speedometer (speedmeter); a photoelectric speed sensor that senses a vehicle speed by using a photo-coupler that is combined by facing a light emitting diode and a phototransistor in a speedometer, and by using a douser (impeller) that is driven through a speedometer cable; and an electronic speed sensor that senses a vehicle speed by sensing a change in a magnetic field caused by the rotation of a magnet, wherein the rotation of a speedometer or a meter driving gear, which is installed in a transmission, is transferred to the magnet through a shaft; and the like.

The wheel speed sensor may sense a change in a line of magnetic force in a tone wheel and a sensor, and may sense a wheel speed.

Also, the sensing unit 210 may sense yaw rate information using a yaw rate sensor that detects the acceleration applied to a car body. The yaw rate sensor may sense the acceleration applied to a car body based on the movement of a roller in a differential motion transformer.

Also, the sensing unit 210 may sense steering angle information by detecting torque using a torque sensor, or may sense steering angle information using a steering angular sensor.

The schemes that the torque sensor measures torque may be classified into a scheme that couples a power transmission shaft and a brake device, radiates the work in the form of heat or electric energy, and calculates torque from the amount of braking done in this instance; and a scheme that measures torque from the angle of twisting or the modification of the power transmission shaft, and the like.

As described above, the sensing unit 210 may sense vehicle speed information, yaw rate information, and steering angle information using a sensor that senses a corresponding factor, but this may not be limited thereto. That is, the sensing unit 210 may use a sensor that senses another factor that is different from a corresponding factor, and may perform sensing by calculating the corresponding factor based on the sensed other factor. The corresponding factor may indicate the vehicle speed information, the yaw rate information, and steering angle information, and the other factor may indicate information that is different from the vehicle speed information, the yaw rate information, and steering angle information.

The calculator 220 may calculate a driving curvature radius using the vehicle speed information and the yaw rate information, which are sensed by the sensing unit 210.

For example, the driving curvature radius may be a value obtained by dividing the vehicle speed information by the yaw rate information.

This is based on the feature in which the vehicle speed information becomes higher and the yaw rate information becomes lower as the driving curvature radius becomes higher, since a road having a high driving curvature radius is a road that approximates a straight line. The calculator 220 calculates a constant by doing an experimentation associated with a driving curvature radius, a vehicle speed, and a yaw rate, and calculates a more detailed driving curvature radius by dividing the product of the calculated constant and the vehicle speed information by the yaw rate information.

Also, the calculator 220 may calculate a steering angular speed using the steering angle information sensed by the sensing unit 210.

As an example, the steering angular speed may be a value obtained by differentiating the steering angle information with respect to a predetermined time.

This may be a value calculated based on the definition of an angular speed (a change of an angle for each change in time).

However, as described above, at least one value out of a driving curvature radius, which is calculated by the calculator 220 based on the vehicle speed information and the yaw rate information sensed by the sensing unit 210, and a steering angular speed, which is calculated based on the steering angle information sensed by the sensing unit 210, may have an error in the situations as follows.

For example, as described in FIG. 1, when a vehicle drives through a simple road including two curves, the yaw rate information sensed by the sensing unit 210 at a predetermined time may be 0 [degree/s]. In this instance, a driving curvature radius calculated based on the yaw rate information may have a value that is different from the actual driving curvature radius of the road. In a similar manner, the error may occur in association with vehicle speed information and steering angle information, in addition to the yaw rate information. The predetermined time may be a point in time when the steering angle of a vehicle is changed from a positive value to a negative value, and vice versa.

To avoid the error, the calculator 220 may calculate a driving curvature radius when vehicle speed information sensed by the sensing unit 210 is constant during a predetermined period of speed holding time, and yaw rate information sensed by the sensing unit 210 is constant during a predetermined period of yaw rate holding time. Also, the calculator 220 may calculate a steering angular speed when steering angle information sensed by the sensing unit 210 is constant during a predetermined period of steering angle holding time.

The speed holding time, the yaw rate holding time, and the steering angle holding time correspond to a period of time for overcoming the above described error, which may be set to be greater than, or equal to, a period of time where a steering angle is changed from a positive value to a negative value and vice versa.

The adjusting unit 230 may adjust the sensing distance of the sensing unit 210 to be decreased when the driving curvature radius calculated by the calculator 220 is less than, or equal to, a predetermined curvature radius, or when the steering angular speed calculated by the calculator 220 is less than, or equal to, a predetermined steering angle.

For example, when the sensing unit 210 senses a forward object using radar that has a predetermined sensing distance, the adjusting unit 230 may adjust a sensing distance by adjusting at least one of a property of a beam, the amount of beam, and a radiation scope of a beam that is radiated from the radar.

The property of the beam, the amount of the beam, and the radiation scope of the beam may respectively indicate a frequency or a wavelength related to the range of the beam, the amount of radiation, and the scope of radiation.

Therefore, when the driving curvature radius calculated by the calculator 220 is less than, or equal to, a predetermined curvature radius or when the steering angular speed is less than, or equal to, a predetermined angular speed, the adjusting unit 230 may adjust the sensing distance to be decreased by adjusting the beam to have the property of a short range, or adjusting the amount of beam or the radiation scope of the beam to have a short range.

Although the above described example has been provided from the perspective of radar, embodiments may not be limited thereto and may be applied to any sensor (a camera, a Lidar, or the like) that is capable of sensing an object.

Also, the adjusting unit 230 may restore the adjusted sensing distance to an existing sensing distance when the driving curvature radius is greater than a predetermined curvature radius and the steering angular speed is greater than a predetermined angular speed during a predetermined period of restoration time.

As described in FIG. 1, when a vehicle drives through a simple road including two curves, yaw rate information sensed by the sensing unit 210 at a predetermined time may be 0 degree/s. In this instance, a driving curvature radius calculated based on the yaw rate information may have a value that is different from the actual driving curvature radius of the road. In a similar manner, the error may be applied to vehicle speed information and steering angle information, in addition to yaw rate information. The predetermined time may be a point in time when the steering angle of a vehicle is changed from a positive value to a negative value, and vice versa.

Due to the error, the sensing distance of the sensing unit 210 may be restored to the existing sensing distance at an unexpected point in time. To avoid the drawback, the adjusting unit 230 sets a restoration time, and may restore the adjusted sensing distance to the existing sensing distance when the driving curvature radius is greater than a predetermined curvature radius and the steering angular speed is greater than a predetermined angular speed during the restoration time.

Although the calculator 220 calculates a driving curvature radius and a steering angular speed by setting a speed holding time, a yaw rate holding time, and a steering angle holding time, in order to overcome an error that may occur at a predetermined point in time, the adjusting unit 230 may additionally set the restoration time for restoring the sensing distance. Therefore, errors may decrease, which may be caused by the sensing apparatus for a vehicle according to an embodiment of the present invention.

In addition, the adjusting unit 230 may adjust the sensing distance to be decreased by multiplying a first ratio and the sensing distance of the sensing unit 210 when the driving curvature radius calculated by the calculator 220 is less than, or equal to, a predetermined curvature radius and the steering angular speed calculated by the calculator 220 is greater than a predetermined steering angle. Also, the adjusting unit 230 may adjust the sensing distance to be decreased by multiplying a second ratio and the sensing distance when the driving curvature radius is greater than the curvature radius and the steering angular speed is less than, or equal to, the angular speed. The adjusting unit 230 may adjust the sensing distance to be decreased by multiplying a third ratio and the sensing distance when the driving curvature radius is less than, or equal to, the curvature radius and the steering angular speed is less than, or equal to, the angular speed. The first ratio, the second ratio, and the third radio are values that are greater than 0 and less than, or equal to, 1. The third radio is greater than, or equal to, the product of the first ratio and the second ratio, and is less than the first radio and the second ratio. Also, the first ratio, the second ratio, and the third ratio may be set based on experimental data which is obtained by doing experiments based on vehicle speed information, yaw rate information, and steering angle information in various road environments including the road environment of FIG. 1.

The calculator 220 may further calculate a lane curvature radius based on a sensed forward object. Particularly, for example, the calculator 220 may calculate a lane curvature radius that is proportional to a horizontal (the vertical direction to a direction in which the vehicle drives) location information variation of the sensed forward object.

Accordingly, the adjusting unit 230 may adjust the sensing distance to be decreased when a difference between a driving radius and a lane curvature radius is within a predetermined limit. Here, determining whether the difference between the driving radius and the lane curvature radius is within the limit is performed to determine whether the vehicle drives along a lane. Therefore, it is determined whether the circumstance where the vehicle drives through is applied to the situation of FIG. 1.

The sensing unit 210 senses parking-on-shoulder permission information by sensing a road sign, or may sense location information first and may sense the parking-on-shoulder permission information based on the sensed location information and parking-on-shoulder permissible location information stored in advance.

Accordingly, when the parking-on-shoulder permission information is sensed by the sensing unit 210, the adjusting unit 230 may adjust the sensing distance to be decreased. Here, determining whether the parking-on-shoulder permission information is sensed is performed to determine whether a sensed forward vehicle is parked on the shoulder. Therefore, it is determined whether the circumstance where the vehicle drives through is applied to the situation of FIG. 1.

Figure 3:
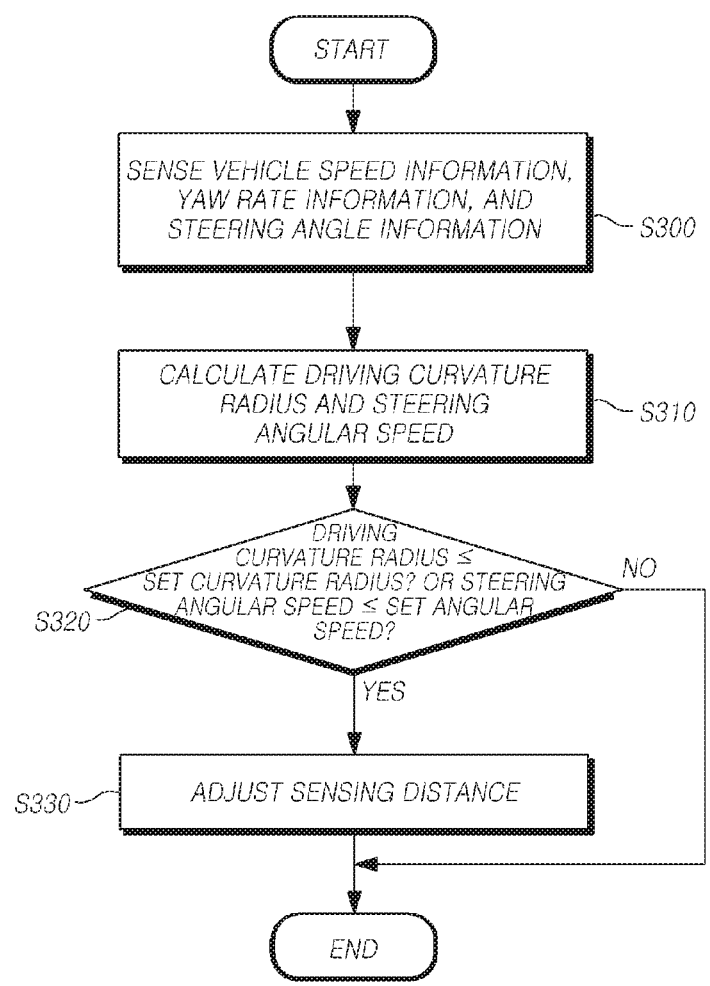
FIG. 3 is a diagram illustrating a first example to describe operations of a sensing apparatus for a vehicle according to an embodiment of the present invention.

FIG. 3 is a diagram illustrating a first example to describe operations of a sensing apparatus for a vehicle according to an embodiment of the present invention.

Referring to FIG. 3, according to a sensing apparatus for a vehicle according to an embodiment of the present invention, a sensing unit senses vehicle speed information, yaw rate information, and vehicle angle information in operation S300.

In operation S300, the sensing unit performs sensing by using a vehicle-mounted sensor that is capable of sensing vehicle speed information, yaw rate information, and steering angle information, but this may not be limited thereto. That is, the sensing unit senses information associated with a factor that is different from the vehicle speed information, the yaw rate information, and the steering angle information, and may calculate the vehicle speed information, the yaw rate information, and the steering angle information based on the information associated with the different factor. Also, although it is described that the sensing unit senses the vehicle speed information, the yaw rate information, and the steering angle information in operation S300 for ease of description, this may not be limited thereto, and may sense at least one out of the vehicle speed information, the yaw rate information, and the steering angle information.

When the sensing unit performs operation S300 and senses the vehicle speed information, the yaw rate information, and the steering angle information, a calculator calculates at least one of a driving curvature radius and a steering angular speed based on the information sensed in operation S300, in operation S310.

For example, the calculator calculates the driving curvature radius by dividing the vehicle speed information by the yaw rate information, or calculates the steering angular speed by differentiating the steering angle information with respect to a predetermined time, in operation S310.

A road having a high driving curvature radius may be a road that approximates a straight line. Accordingly, the calculation uses a feature in which the vehicle speed information becomes higher and the yaw rate information becomes smaller as the driving curvature radius becomes higher, and the calculation is based on the definition of an angular speed (a change of an angle for each change in time).

When the calculator performs operation S310, and calculates the driving curvature radius and the steering angular speed, the adjusting unit determines whether the driving curvature radius is less than, or equal to, a predetermined curvature radius or the steering angular speed is less than, or equal to, a predetermined angular speed in operation S320.

When the adjusting unit determines that the driving curvature radius is less than, or equal to, the predetermined curvature radius or the steering angular speed is less than, or equal to, the predetermined angular speed in operation S320 (YES), the adjusting unit adjusts the sensing distance of the sensing unit to be decreased in operation S330.

For example, the adjusting unit may adjust a property so as to shorten a range, or may adjust a quantity or may adjust a radiation scope so as to shorten a range, in operation S330.

Figure 4:
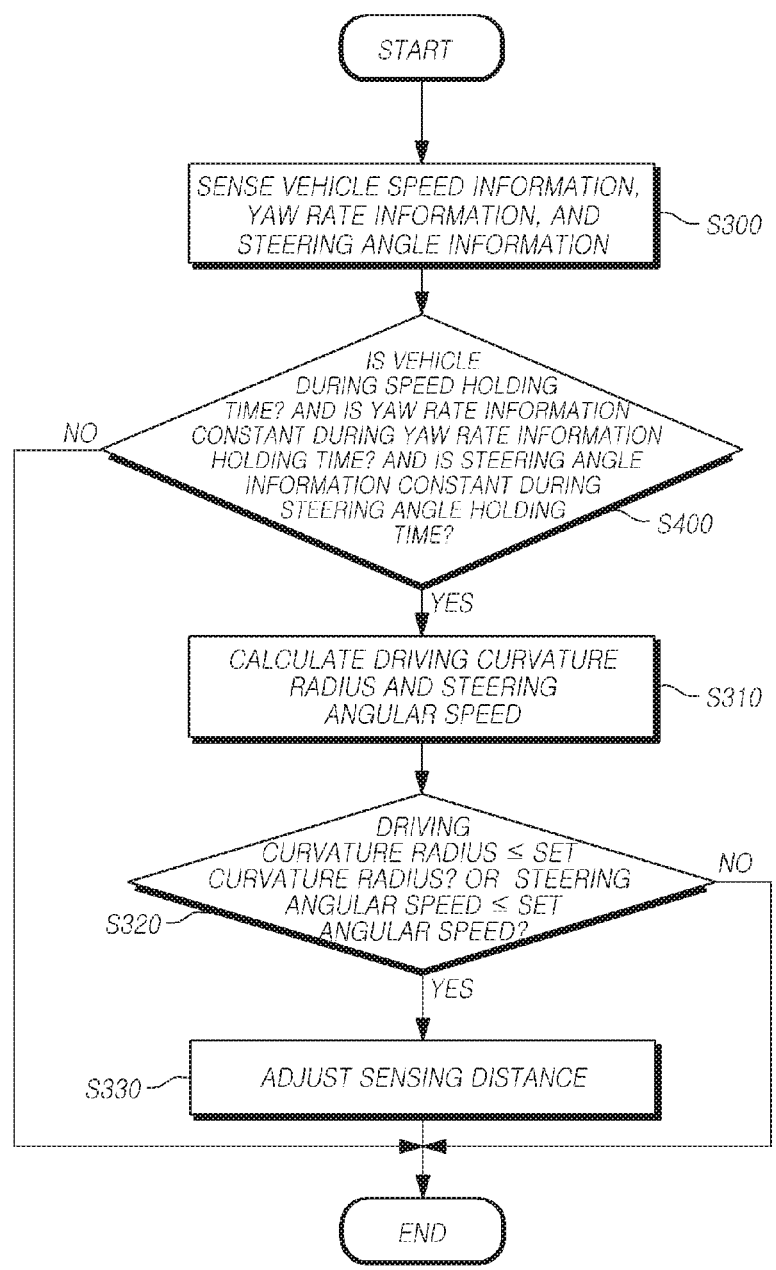
FIG. 4 is a diagram illustrating a second example to describe operations of a sensing apparatus for a vehicle according to an embodiment of the present invention.

FIG. 4 is a diagram illustrating a second example to describe operations of a sensing apparatus for a vehicle according to an embodiment of the present invention.

Referring to FIG. 4, a sensing apparatus for a vehicle according to an embodiment of the present invention further determines whether the vehicle speed information calculated by the calculator in operation S300 is constant during a predetermined period of speed holding time, the yaw rate information is constant during a predetermined period of yaw rate holding time, and the steering angle information is constant during a predetermined period of steering angle holding time, in operation S400, which may be performed between operations S300 and S310 among the operations of the sensing apparatus for a vehicle according to an embodiment of the present invention (operations S300 to S330) that has been described through FIG. 3.

The predetermined period of speed holding time, the predetermined period of yaw rate holding time, and the predetermined period of steering angle holding time in operation S400, may be a period of time for overcoming an error when a driving curvature radius calculated based on vehicle speed information and yaw rate information that are sensed in a predetermined situation may have a value that is different from the actual driving curvature radius of a road.

For example, in the case in which a vehicle drives through a road having a curve, yaw rate information sensed by the sensing unit under a predetermined situation in which the steering angle of the vehicle is changed from a positive value to a negative value and vice and versa is 0 [degree/s], and a driving curvature radius calculated based on the yaw rate information may have a value that is different from the actual driving curvature radius of the road. The yaw rate holding time may be set as a period of time for overcoming an error that may occur under the situation.

Also, when vehicle speed information and steering angle information have unexpected values due to an external factor, a driving curvature radius and a steering angular speed obtained based on the vehicle speed information and the steering angle information may be erroneous values. The external factor may include a driver's inclination to drive fast, an unexpected situation happening on a road, and the like. The speed holding time and the steering angle holding time may be set as a period of time for overcoming an error that may occur under the situation.

As the speed holding time, the yaw rate holding time, and the steering angle holding time set to be longer, the above described error may be avoided more perfectly. However, a response characteristic becomes worse. Therefore, they need to be set eclectically by taking into consideration the relationship.

Accordingly, when it is determined that the vehicle speed information is constant during a predetermined period of speed holding time, the yaw rate information is constant during a predetermined period of yaw rate holding time, and the steering angle information is constant during a predetermined period of steering angle holding time in operation S400 (YES), the method proceeds with operations S310 to S330.

Unlike the above, when it is determined that one or more out of the vehicle speed information, the yaw rate information, and the steering angle information are not constant during a corresponding holding time in operation S400 (NO), the method may end without performing operations S310 to S330.

Figure 5:
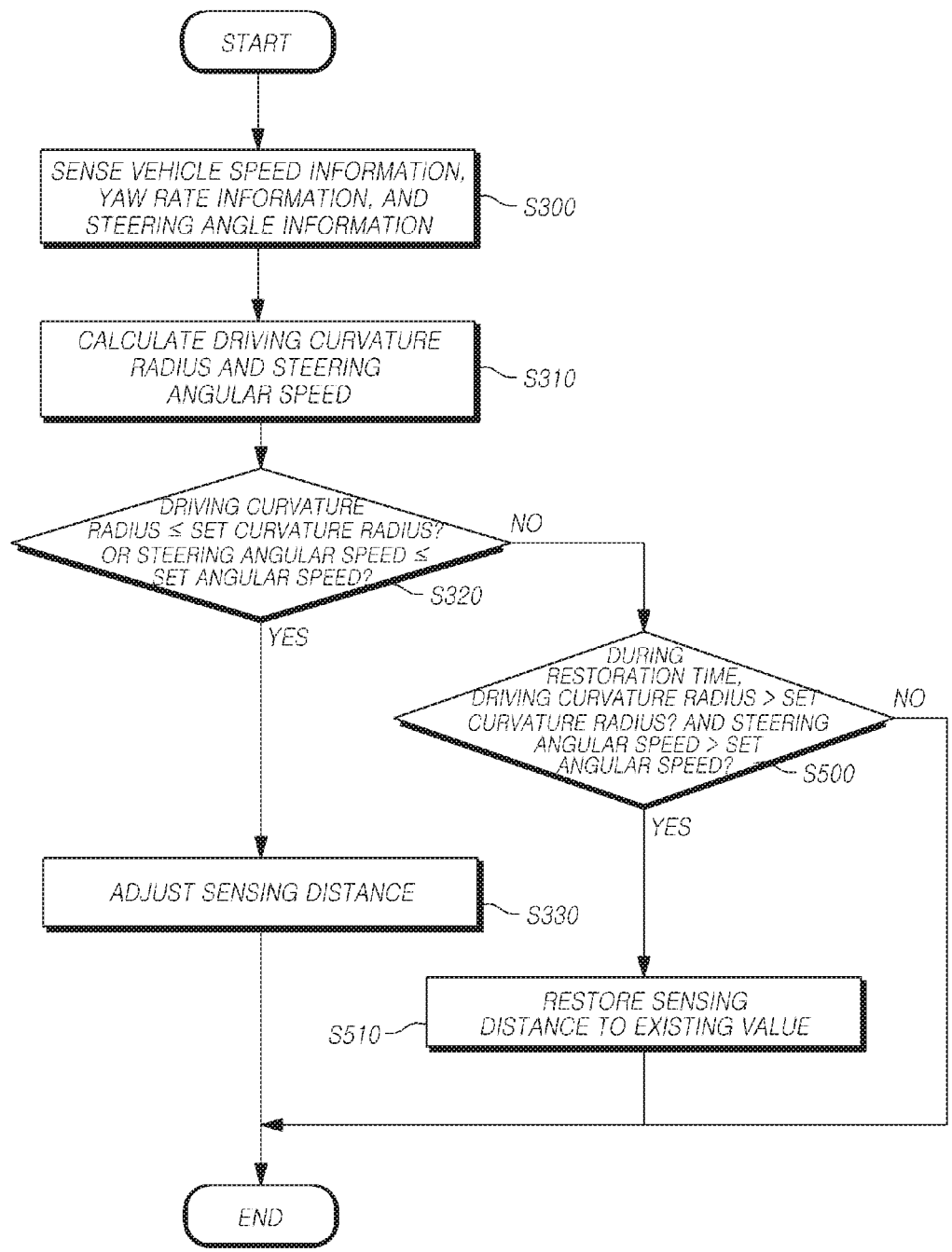
FIG. 5 is a diagram illustrating a third example to describe operations of a sensing apparatus for a vehicle according to an embodiment of the present invention.

FIG. 5 is a diagram illustrating a third example to describe operations of a sensing apparatus for a vehicle according to an embodiment of the present invention.

Referring to FIG. 5, according to a sensing apparatus for a vehicle according to an embodiment of the present invention, the adjusting unit determines whether the driving curvature radius is greater than the predetermined curvature radius and the steering angular speed is greater than the predetermined angular speed during the predetermined restoration time in operation S500, when the determination in operation S320 shows NO among the operations of the sensing apparatus for a vehicle according to an embodiment of the present invention (operations S300 to S330), which has been described through FIG. 3.

When it is determined that the driving curvature radius is greater than the predetermined curvature radius and the steering angle speed is greater than the predetermined angular speed (YES) in operation S500, the adjusting unit restores the adjusted sensing distance to an existing sensing distance in operation S510. The adjusted sensing distance of operation S510 may indicate a sensing distance that is adjusted through operation S330 in a previous period operation.

Due to the road environment where the vehicle drives through, the calculated driving curvature radius becomes higher than a set curvature radius and the calculated steering angular speed becomes higher than a set angular speed at an unexpected point in time, and the sensing distance is restored to the existing sensing distance, which is a drawback. The drawback may be prevented when the adjusting unit further performs operations S500 to S510.

Figure 6:
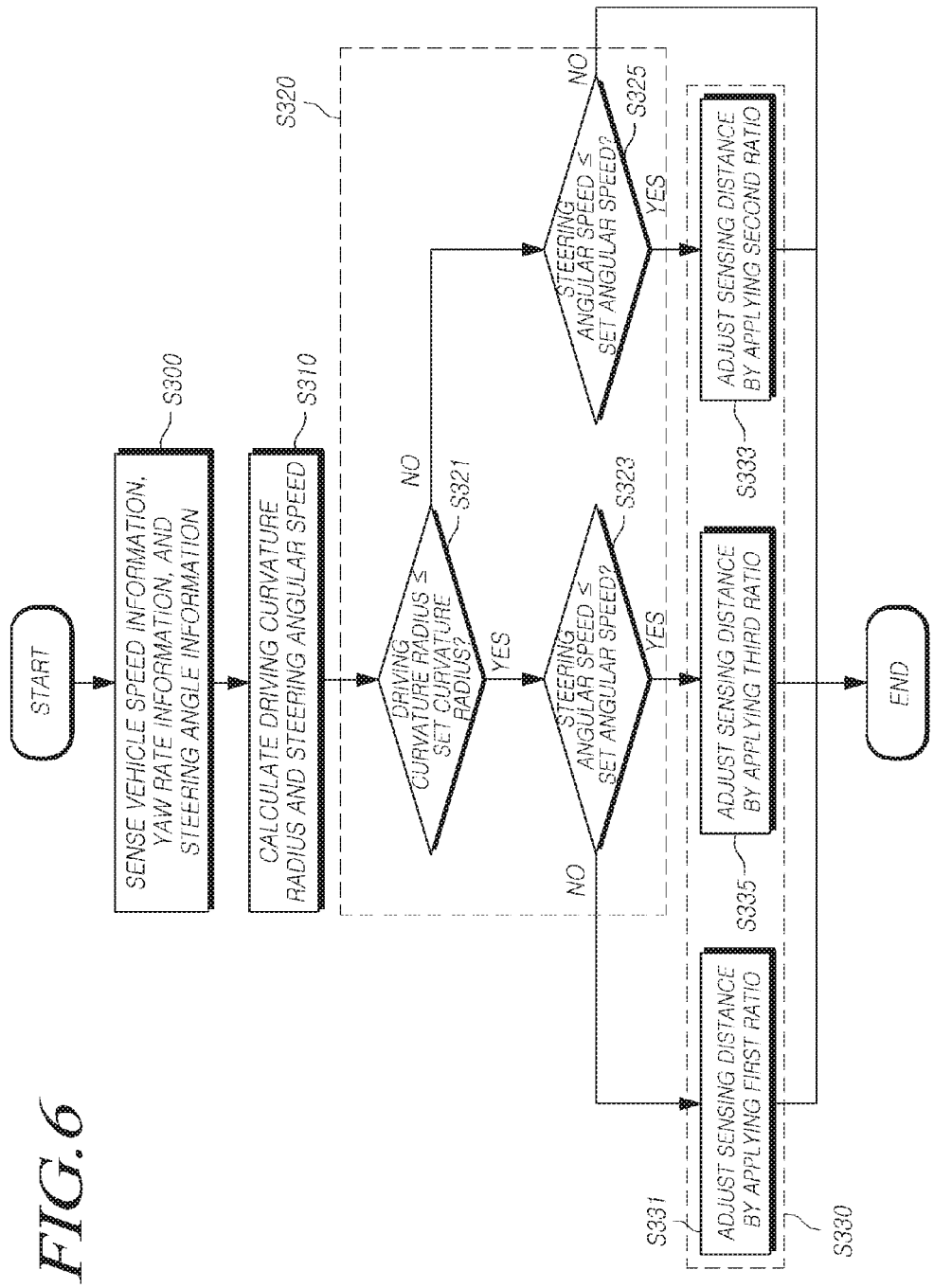
FIG. 6 is a diagram illustrating a fourth example to describe operations of a sensing apparatus for a vehicle according to an embodiment of the present invention.

FIG. 6 is a diagram illustrating a fourth example to describe operations of a sensing apparatus for a vehicle according to an embodiment of the present invention.

The adjusting unit may: adjust a sensing distance by applying a first ratio to the sensing distance when a driving curvature radius is less than, or equal to, a predetermined curvature radius and a steering angular speed is greater than a predetermined angular speed; adjust the sensing distance by applying a second ratio to the sensing distance when the driving curvature radius is greater than the curvature radius and the steering angular speed is less than, or equal to, the angular speed; and adjust the sensing distance by applying a third ratio to the sensing distance when the driving curvature radius is less than, or equal to, the curvature radius and the steering angular speed is less than, or equal to, the angular speed.

Referring to FIG. 6, a sensing apparatus for a vehicle according to an embodiment of the present invention may execute operation S320 by performing operations S321 to S325, and may execute operation S330 by performing operations S331 to S335, among the operations of the sensing apparatus for a vehicle according to an embodiment of the present invention (operations S300 to S330) which have been described with reference to FIG. 3.

That is, operation S320 that the adjusting unit proceeds with may determine whether a driving curvature radius is less than, or equal to, a predetermined curvature radius in operation S321, and determines whether a steering angular speed is less than, or equal to, a predetermined curvature speed in operations S323 and S325.

Accordingly, when it is determined that the driving curvature radius is less than, or equal to, the predetermined curvature radius (YES) in operation S321, and when it is determined that the steering angular speed is greater than the predetermined angular speed (NO) in operation S323, the adjusting unit adjusts the sensing distance of the sensing unit by applying the first ratio to the sensing distance in operation S331.

When it is determined that the driving curvature radius is greater than the curvature radius in operation S321 (NO), and when it is determined that the steering angular speed is less than, or equal to, the angular speed in operation S325 (YES), the adjusting unit adjusts the sensing distance of the sensing unit by applying the second ratio to the sensing distance in operation S333.

Unlike the above, when it is determined that the driving curvature radius is less than, or equal to, the curvature radius (YES) in operation S321, and when it is determined that the steering angular speed is less than, or equal to, the angular speed (YES) in operation S323, the adjusting unit adjusts the sensing distance of the sensing unit by applying the third ratio in operation S335.

The first ratio, the second ratio, and the third radio may be set to values that are greater than 0 and less than, or equal to, 1. The third radio may be set to be greater than, or equal to, the product of the first ratio and the second ratio, and to be less than the first radio and the second ratio. Through the settings, the sensing distance that is adjusted by the adjusting unit may be smaller than the existing sensing distance.

The sensing apparatus for a vehicle according to an embodiment of the present invention may separately use each distinguished function as described with reference to FIGS. 3 to 6, but this may not be limited thereto. That is, the sensing apparatus for a vehicle according to an embodiment of the present invention may operate by using two or more distinguished functions in FIGS. 3 to 6.

Figure 7:
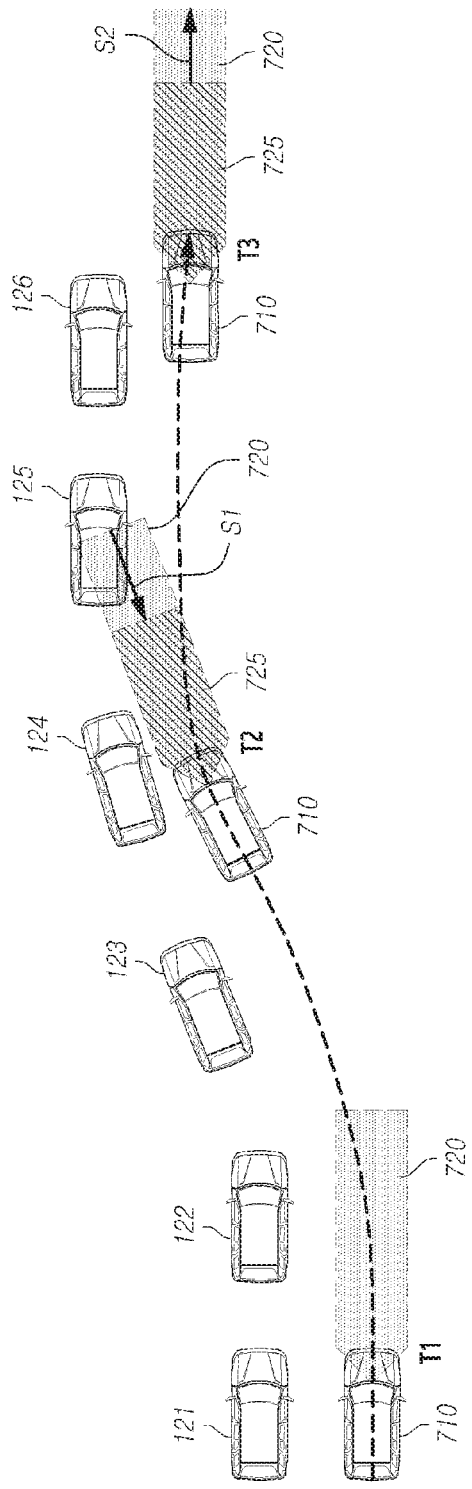
FIG. 7 is a diagram illustrating a fifth example to describe operations of a sensing apparatus for a vehicle according to an embodiment of the present invention.

FIG. 7 is a diagram illustrating a fifth example to describe operations of a sensing apparatus for a vehicle according to an embodiment of the present invention.

Referring to FIG. 7, the sensing apparatus for a vehicle according to an embodiment that has been described through FIGS. 3 to 6 may change an existing sensing distance 720 to a new sensing distance 725, or may change the new sensing distance 725 to the existing sensing distance 720 based on a circumstance where a vehicle 710 equipped with the sensing apparatus drives through.

Particularly, when a calculator of the sensing apparatus for a vehicle according to an embodiment of the present invention, which is installed in the vehicle 710, calculates a driving curvature radius that is greater than a predetermined curvature radius at T1, an adjusting unit maintains the existing sensing distance 720. When the calculator of the sensing apparatus for a vehicle according to an embodiment of the present invention, which is installed in the vehicle 710, calculates a driving curvature radius that is less than, or equal to, the curvature radius at T2, the adjusting unit adjusts (S1) the existing sensing distance 720 to the new sensing distance 725. When the calculator of the sensing apparatus for a vehicle according to an embodiment of the present invention, which is installed in the vehicle 710, calculates a driving curvature radius that is greater than the predetermined curvature radius at T3 during a restoration time, the adjusting unit restores the new sensing distance 725 to the existing sensing distance 720.

In FIG. 7, the sensing apparatus for a vehicle according to an embodiment of the present invention, which operates as described above, may adjust (S1) the existing sensing distance 720 to the new sensing distance 725 at T2, to enable the vehicle 710 to not recognize the parked vehicle 125. Therefore, a steer control device and a brake control device installed in the vehicle 710 may not be operated. The steering control device and the brake control device may be included in a driving assistance system (DAS) which recognizes that collision risk exists when the sensing apparatus senses an object, and operates a steering device and a brake so as to avoid a collision.

Hereinafter, a sensing method for a vehicle will be briefly described, which is performed by the sensing apparatus for a vehicle that has been described with reference to FIGS. 2 to 7.

Figure 8:
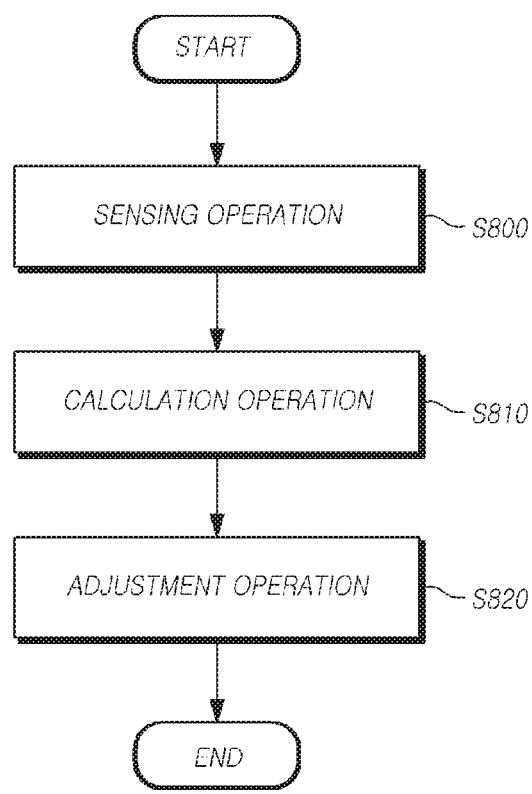
FIG. 8 is a flowchart illustrating a sensing method for a vehicle according to an embodiment of the present invention.

FIG. 8 is a flowchart illustrating a sensing method for a vehicle according to an embodiment of the present invention.

Referring to FIG. 8, the sensing method for a vehicle according to an embodiment of the present invention may include: a sensing operation (S800) that senses at least one of vehicle speed information, yaw rate information, and steering angle information, and senses a forward object existing within a predetermined sensing distance; a calculation operation (S810) that calculates at least one of a driving curvature radius, which is calculated based on the sensed vehicle speed information and the yaw rate information, and a steering angular speed which is calculated based on the sensed steering angle information; and an adjustment operation (S820) that adjusts a sensing distance to be decreased when the calculated driving curvature radius is less than, or equal to, a predetermined curvature radius or the calculated steering angular speed is less than, or equal to, a predetermined angular speed.

The sensing operation (S800) may sense the vehicle speed information using a vehicle-mounted sensor that is capable of sensing a vehicle speed, which includes a speed sensor, a wheel speed sensor, and the like.

The speed sensor may include, for example, a reed switch-based speed sensor that senses a vehicle speed by generating an ON or OFF signal a number of times that is proportional to the vehicle speed by a reed switch or by being mounted to a portion adjacent to a rotatable magnet in a speedometer (speedmeter); a photoelectric speed sensor that senses a vehicle's speed using a photo-coupler that is combined by facing a light emitting diode and a phototransistor in a speedometer, and using a douser (impeller) that is driven through a speedometer cable; and an electronic speed sensor that senses a vehicle's speed by sensing a change in a magnetic field caused by the rotation of a magnet, wherein the rotation of a speedometer or a meter driving gear, which is installed in a transmission, is transferred to the magnet through a shaft; and the like.

The wheel speed sensor may sense a change in a line of magnetic force in a tone wheel and a sensor, and may sense a wheel speed.

Also, the sensing operation (S800) may sense yaw rate information using a yaw rate sensor that detects the acceleration applied to a car body. The yaw rate sensor may sense the acceleration applied to a car body based on the movement of a roller in a differential motion transformer.

Also, the sensing operation (S800) may sense steering angle information by detecting torque using a torque sensor, or may sense steering angle information using a steering angular sensor.

The schemes that the torque sensor measures torque may be classified into: a scheme that couples a power transmission shaft and a brake device, radiates the work in the form of heat or electric energy, and calculates torque from the amount of braking done in this instance; and a scheme that measures torque from the angle of twisting or the modification of the power transmission shaft, and the like.

As described above, the sensing operation (S800) may sense vehicle speed information, yaw rate information, and steering angle information using a sensor that senses a corresponding factor, but this may not be limited thereto. That is, the sensing operation (S800) may use a sensor that senses another factor that is different from a corresponding factor, and may perform sensing by calculating the corresponding factor based on the sensed other factor. The corresponding factor may indicate the vehicle speed information, the yaw rate information, and steering angle information, and the other factor may indicate information that is different from the vehicle speed information, the yaw rate information, and steering angle information.

The calculating operation (S810) may calculate a driving curvature radius using the vehicle speed information and the yaw rate information sensed in the sensing operation (S800).

For example, the driving curvature radius may be a value obtained by dividing the vehicle speed information by the yaw rate information.

This is based on the feature in which vehicle speed information becomes higher and yaw rate information becomes lower as a driving curvature radius becomes higher, since a road having a high driving curvature radius is a road that approximates a straight line. The calculating operation (S810) calculates a constant by doing an experimentation associated with a driving curvature radius, a vehicle speed, and a yaw rate, and calculates a more detailed driving curvature radius by dividing the product of the calculated constant and the vehicle speed information by the yaw rate information.

Also, the calculation operation (S810) may calculate a steering angular speed using the steering angle information sensed in the sensing operation (S800).

As an example, the steering angular speed may be a value obtained by differentiating the steering angle information with respect to a predetermined time.

This may be a value calculated based on the definition of an angular speed (a change of an angle for each change in time).

However, as described above, at least one value out of the driving curvature radius, which is calculated in the calculation operation (S810) based on the vehicle speed information and the yaw rate information sensed in the sensing operation (S800), and the steering angular speed, which is calculated based on the steering angle information sensed in the sensing operation (S800), may have an error in the situations as follows.

For example, as described in FIG. 1, when a vehicle drives through a simple road including two curves, the yaw rate information sensed in the sensing operation (S800) at a predetermined time may be 0 [degree/s]. In this instance, a driving curvature radius calculated based on the yaw rate information may have a value that is different from the actual driving curvature radius of the road. In a similar manner, the error may be applied to vehicle speed information and steering angle information, in addition to yaw rate information. The predetermined time may be a point in time when the steering angle of a vehicle is changed from a positive value to a negative value, and vice versa.

To avoid the error, the calculation operation (S810) may calculate a driving curvature radius when vehicle speed information sensed in the sensing operation (S800) is constant during a predetermined period of speed holding time, and yaw rate information sensed in the sensing operation (S800) is constant during a predetermined period of yaw rate holding time. Also, the calculation operation (S810) may calculate a steering angular speed when steering angle information sensed in the sensing operation (S800) is constant during a predetermined period of steering angle holding time.

The speed holding time, the yaw rate holding time, and the steering angle holding time is a period of time for overcoming the above described error, which may be set to be greater than, or equal to, a period of time where a steering angle is changed from a positive value to a negative value and vice versa.

The adjusting operation (S820) may adjust the sensing distance of the sensing operation (S800) to be decreased when the driving curvature radius calculated in the calculation operation (S810) is less than, or equal to, a predetermined curvature radius, or when the steering angular speed calculated in the calculation operation (S810) is less than, or equal to, a predetermined steering angle.

For example, when the sensing operation (S800) senses a forward object using radar that has a predetermined sensing distance, the adjusting operation (S820) may adjust a sensing distance by adjusting at least one of a beam's property, the amount of beam, and a radiation scope of a beam that is radiated from the radar.

The property of the beam, the amount of beam, and the radiation scope of the beam may respectively indicate a frequency or a wavelength related to the range of the beam, the amount of radiation, and the scope of radiation.

Therefore, when the driving curvature radius calculated in the calculation operation (S810) is less than, or equal to, a predetermined curvature radius or when the steering angular speed is less than, or equal to, a predetermined angular speed, the adjusting operation (S820) may adjust the sensing distance to be decreased by adjusting the beam to have the property of a short range, or adjusting the amount of beam or the radiation scope of the beam to have a short range.

Although the above described example has been provided from the perspective of radar, embodiments may not be limited thereto and may be applied to any sensor (a camera, a Lidar, or the like) that is capable of sensing an object.

Also, the adjustment operation (S820) may restore the adjusted sensing distance to an existing sensing distance when the driving curvature radius is greater than a predetermined curvature radius and the steering angular speed is greater than a predetermined angular speed during a predetermined restoration time.

As described in FIG. 1, when a vehicle drives through a simple road including two curves, the yaw rate information sensed in the sensing operation (S800) at a predetermined time may be 0 [degree/s]. In this instance, a driving curvature radius calculated based on the yaw rate information may have a value that is different from the actual driving curvature radius of the road. In a similar manner, the error may be applied to vehicle speed information and steering angle information, in addition to yaw rate information. The predetermined time may be a point in time when the steering angle of a vehicle is changed from a positive value to a negative value, and vice versa.

Due to the error, the sensing distance of the sensing operation (S800) may be restored to the existing sensing distance at an unexpected point in time. To avoid the drawback, the adjustment operation (S820) sets a restoration time, and may restore the adjusted sensing distance to the existing sensing distance when the driving curvature radius is greater than a predetermined curvature radius and the steering angular speed is greater than a predetermined angular speed during the restoration time.

Although the calculation operation (S810) calculates a driving curvature radius and a steering angular speed by setting a speed holding time, a yaw rate holding time, and a steering angle holding time, in order to overcome an error that may occur at a predetermined point in time, the adjustment operation (S820) may additionally set the restoration time for restoring the sensing distance.

Therefore, errors may decrease, which may be caused by the sensing apparatus for a vehicle according to an embodiment of the present invention.

In addition, the adjustment operation (S820) may adjust the sensing distance to be decreased by multiplying a first ratio and the sensing distance of the sensing operation (S820) when the driving curvature radius calculated in the calculation operation (S810) is less than, or equal to, a predetermined curvature radius and the steering angular speed calculated in the calculation operation (S810) is greater than a predetermined steering angle. Also, the adjustment operation (S800) may adjust the sensing distance to be decreased by multiplying a second ratio and the sensing distance when the driving curvature radius is greater than the curvature radius and the steering angular speed is less than, or equal to, the angular speed. The adjustment operation (S820) may adjust the sensing distance to be decreased by multiplying a third ratio and the sensing distance when the driving curvature radius is less than, or equal to, the curvature radius and the steering angular speed is less than, or equal to, the angular speed. The first ratio, the second ratio, and the third radio are values that are greater than 0 and less than or equal to 1. The third radio is greater than, or equal to, the product of the first ratio and the second ratio, and is less than the first radio and the second ratio. Also, the first ratio, the second ratio, and the third ratio may be set based on experimental data that is obtained by doing experimentations based on vehicle speed information, yaw rate information, and steering angle information in various road environments including the road environment of FIG. 1.

The calculation operation (S810) may further calculate a lane curvature radius based on a sensed forward object. Particularly, for example, the calculation operation (S810) may calculate a lane curvature radius that is proportional to a horizontal (the vertical direction to a direction in which the vehicle drives) location information variation of the sensed forward object.

Accordingly, the adjustment operation (S820) may adjust the sensing distance to be decreased when a difference between a driving curvature and a lane curvature radius is within a predetermined limit. Here, determining whether the difference between the driving radius and the lane curvature radius is within the limit is performed to determine whether the vehicle drives along a lane. Therefore, it is determined whether the circumstance where the vehicle drives through is applied to the situation of FIG. 1.

The sensing operation (S800) may sense parking-on-shoulder permission information by sensing a road sign, or may sense location information first and may sense the parking-on-shoulder permission information based on the sensed location information and parking-on-shoulder permissible location information stored in advance.

Accordingly, when the parking-on-shoulder permission information is sensed in the sensing operation (S800), the adjustment operation (s820) may adjust the sensing distance to be decreased. Here, determining whether the parking-on-shoulder permission information is sensed is performed to determine whether a sensed forward vehicle is parked on the shoulder. Therefore, it is determined whether the circumstance where the vehicle drives through is applied to the situation of FIG. 1.

In addition to the above, the sensing method for a vehicle may be capable of performing each operation that is performed by the sensing apparatus for a vehicle, which has been described with reference to FIGS. 1 to 7.

Figure 9:
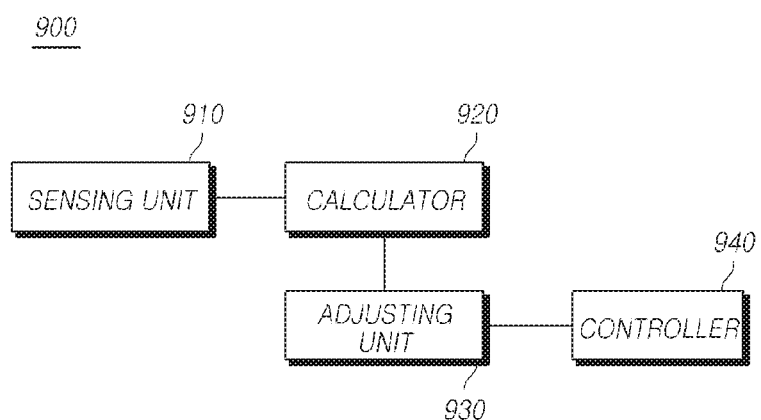
FIG. 9 is a diagram illustrating a configuration of a control apparatus for a vehicle according to an embodiment of the present invention.

FIG. 9 is a diagram illustrating a configuration of a control apparatus for a vehicle according to an embodiment of the present invention.

Referring to FIG. 9, a control apparatus 900 for a vehicle according to an embodiment of the present invention may include: a sensing unit 910 that senses at least one of vehicle speed information, yaw rate information, and steering angle information, and senses a forward object existing within a predetermined sensing distance; a calculator 920 that calculates at least one of a driving curvature radius, which is calculated based on the sensed vehicle speed information and the yaw rate information, and a steering angular speed, which is calculated based on the sensed steering angle information; an adjusting unit 930 that adjusts a threshold distance to be decreased when the calculated driving curvature radius is less than, or equal to, a predetermined curvature radius or the calculated steering angular speed is less than, or equal to, a predetermined angular speed; and a controller 940 that controls a notification device or a brake device when the distance to a forward object is less than the threshold distance.

The sensing unit 910 may sense the vehicle speed information using a vehicle-mounted sensor that is capable of sensing a vehicle speed, which includes a speed sensor, a wheel speed sensor, and the like.

Also, the sensing unit 910 may sense yaw rate information using a yaw rate sensor that detects the acceleration applied to a car body. The yaw rate sensor may sense the acceleration applied to a car body based on the movement of a roller in a differential motion transformer.

Also, the sensing unit 910 may sense steering angle information by detecting torque using a torque sensor, or may sense steering angle information using a steering angular sensor.

As described above, the sensing unit 910 may sense vehicle speed information, yaw rate information, and steering angle information using a sensor that senses a corresponding factor, but this may not be limited thereto. That is, the sensing unit 910 may use a sensor that senses another factor that is different from a corresponding factor, and may perform sensing by calculating the corresponding factor based on the sensed other factor. The corresponding factor may indicate the vehicle speed information, the yaw rate information, and steering angle information, and the other factor may indicate information that is different from the vehicle speed information, the yaw rate information, and steering angle information.

The calculator 920 may calculate a driving curvature radius using the vehicle speed information and the yaw rate information sensed by the sensing unit 910.

For example, the driving curvature radius may be a value obtained by dividing vehicle speed information by yaw rate information.

This is based on the feature in which vehicle speed information becomes higher and yaw rate information becomes lower as a driving curvature radius becomes higher, since a road having a high driving curvature radius is a road that approximates a straight line. The calculator 920 calculates a constant by doing an experimentation associated with a driving curvature radius, a vehicle speed, and a yaw rate, and calculates a more detailed driving curvature radius by dividing the product of the calculated constant and vehicle speed information by yaw rate information.

Also, the calculator 920 may calculate a steering angular speed using the steering angle information sensed by the sensing unit 910.

As an example, the steering angular speed may be a value obtained by differentiating steering angle information with respect to a predetermined time.

This may be a value calculated based on the definition of an angular speed (a change of an angle for each change in time).

However, as described above, at least one value out of a driving curvature radius, which is calculated by the calculator 920 based on the vehicle speed information and the yaw rate information sensed by the sensing unit 910, and a steering angular speed, which is calculated based on the steering angle information sensed by the sensing unit 910, may have an error in the situations as follows.

For example, as described in FIG. 1, when a vehicle drives through a simple road including two curves, the yaw rate information sensed by the sensing unit 910 at a predetermined time may be 0 [degree/s]. In this instance, a driving curvature radius calculated based on the yaw rate information may have a value that is different from the actual driving curvature radius of the road. In a similar manner, the error may be applied to vehicle speed information and steering angle information, in addition to yaw rate information. The predetermined time may be a point in time when the steering angle of a vehicle is changed from a positive value to a negative value, and vice versa.

To avoid the error, the calculator 920 may calculate a driving curvature radius when vehicle speed information sensed by the sensing unit 910 is constant during a predetermined period of speed holding time, and yaw rate information sensed by the sensing unit 910 is constant during a predetermined period of yaw rate holding time. Also, the calculator 920 may calculate a steering angular speed when steering angle information sensed by the sensing unit 910 is constant during a predetermined period of steering angle holding time.

The speed holding time, the yaw rate holding time, and the steering angle holding time is a period of time for overcoming the above described error, which may be set to be greater than, or equal to, a period of time where a steering angle is changed from a positive value to a negative value and vice versa.

The adjusting unit 930 may adjust the threshold distance to be decreased when the driving curvature radius calculated by the calculator 920 is less than, or equal to, a predetermined curvature radius, or when the steering angular speed calculated by the calculator 920 is less than, or equal to, a predetermined steering angle.

Also, the adjusting unit 930 may restore the adjusted threshold distance to an existing threshold distance when the driving curvature radius is greater than a predetermined curvature radius and the steering angular speed is greater than a predetermined angular speed during a predetermined restoration time.

As described in FIG. 1, when a vehicle drives through a simple road including two curves, yaw rate information sensed by the sensing unit 910 at a predetermined time may be 0 [degree/s]. In this instance, a driving curvature radius calculated based on the yaw rate information may have a value that is different from the actual driving curvature radius of the road. In a similar manner, the error may be applied to vehicle speed information and steering angle information, in addition to yaw rate information. The predetermined time may be a point in time when the steering angle of a vehicle is changed from a positive value to a negative value, and vice versa.

Due to the error, the threshold distance may be restored to the existing threshold distance at an unexpected point in time. To avoid the drawback, the adjusting unit 930 sets a restoration time, and may restore the adjusted threshold distance to the existing threshold distance when the driving curvature radius is greater than a predetermined curvature radius and the steering angular speed is greater than a predetermined angular speed during the restoration time.

Although the calculator 920 calculates a driving curvature radius and a steering angular speed by setting a speed holding time, a yaw rate holding time, and a steering angle holding time, in order to overcome an error that may occur at a predetermined point in time, the adjusting unit 930 may additionally set the restoration time for restoring the threshold distance.

The controller 940 may control a notification device or a brake device when the distance to the forward object sensed by the sensing unit 910 is less than the threshold distance adjusted in the adjusting unit 930. The notification device and the brake device may be devices that are generally used in the automotive field, and additional descriptions thereof will be omitted.

Therefore, errors may decrease, which may be caused by the control apparatus for a vehicle according to an embodiment of the present invention.

In addition, the adjusting unit 930 may adjust the threshold distance to be decreased by multiplying a first ratio and the threshold distance when the driving curvature radius calculated by the calculator 920 is less than, or equal to, a predetermined curvature radius and the steering angular speed calculated by the calculator 920 is greater than a predetermined steering angle. Also, the adjusting unit 930 may adjust the threshold distance to be decreased by multiplying a second ratio and the threshold distance when the driving curvature radius is greater than the curvature radius and the steering angular speed is less than, or equal to, the angular speed. The adjusting unit 930 may adjust the threshold distance to be decreased by multiplying a third ratio and the threshold distance when the driving curvature radius is less than, or equal to, the curvature radius and the steering angular speed is less than, or equal to, the angular speed. The first ratio, the second ratio, and the third radio are values that are greater than 0 and less than, or equal to, 1. The third radio is greater than, or equal to, the product of the first ratio and the second ratio, and is less than the first radio and the second ratio. Also, the first ratio, the second ratio, and the third ratio may be set based on experimental data that is obtained by doing experimentations based on vehicle speed information, yaw rate information, and steering angle information in various road environments including the road environment of FIG. 1.

The calculator 920 may further calculate a lane curvature radius based on a sensed forward object. Particularly, for example, the calculator 920 may calculate a lane curvature radius that is proportional to a horizontal (the vertical direction to a direction in which the vehicle drives) location information variation of the sensed forward object.

Accordingly, the adjusting unit 930 may adjust the threshold distance to be decreased when a difference between a driving curvature and a lane curvature radius is within a predetermined limit.

The sensing unit 910 may sense parking-on-shoulder permission information by sensing a road sign, or may sense location information first and may sense the parking-on-shoulder permission information based on the sensed location information and parking-on-shoulder permissible location information stored in advance.

Accordingly, when the parking-on-shoulder permission information is sensed by the sensing unit 910, the adjusting unit 930 may adjust the threshold distance to be decreased.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A sensing apparatus for a vehicle, the apparatus comprising:
a sensing unit that is configured to sense at least one of vehicle speed information, yaw rate information, and steering angle information, and to sense a forward object existing within a sensing distance set in advance;
a calculator that is configured to calculate at least one of a driving curvature radius, which is calculated based on the vehicle speed information and the yaw rate information, and a steering angular speed, which is calculated based on the steering angle information; and
an adjusting unit that is configured to adjust the sensing distance to be decreased when the driving curvature radius is less than, or equal to, a predetermined curvature radius or when the steering angular speed is less than, or equal to, a predetermined angular speed.

2. The apparatus of claim 1, wherein the driving curvature radius is calculated by dividing the vehicle speed information by the yaw rate information, and the steering angular speed is calculated by differentiating the steering angle information with respect to a predetermined time.

3. The apparatus of claim 1, wherein the calculator is configured to perform:
calculating the driving curvature radius when the vehicle speed information is constant during a predetermined period of speed holding time and the yaw rate information is constant during a predetermined period of yaw rate holding time, and calculating the steering angular speed when the steering angle information is constant during a predetermined period of steering angle holding time.

4. The apparatus of claim 1, wherein the calculator is configured to further perform: calculating a lane curvature radius based on the forward object; and
the adjusting unit is configured to adjust the sensing distance to be decreased when a difference between the driving curvature radius and the lane curvature radius is within a predetermined limit.

5. The apparatus of claim 1, wherein the sensing unit is configured to further sense parking-on-shoulder permission information; and
the adjusting unit is configured to adjust the sensing distance to be decreased when the parking-on-shoulder permission information is sensed.

6. The apparatus of claim 5, wherein the sensing unit is configured to sense the parking-on-shoulder permission information by sensing a road sign.

7. The apparatus of claim 5, wherein the sensing unit is configured to sense location information, and sense the parking-on-shoulder permission information using the location information and parking-on-shoulder permissible location information that is stored in advance.

8. The apparatus of claim 1, wherein the adjusting unit is configured to restore the adjusted sensing distance to an existing sensing distance when the driving curvature radius is greater than a predetermined curvature radius and the steering angular speed is greater than a predetermined angular speed during a predetermined period of restoration time.

9. The apparatus of claim 1, wherein the adjusting unit is configured to perform:
adjusting the sensing distance by applying a first ratio to the sensing distance when the driving curvature radius is less than, or equal to, the curvature radius and the steering angular speed is greater than the angular speed;
adjusting the sensing distance by applying a second ratio to the sensing distance when the driving curvature radius is greater than the curvature radius and the steering angular speed is less than, or equal to, the angular speed; and
adjusting the sensing distance by applying a third ratio to the sensing distance when the driving curvature radius is less than, or equal to, the curvature radius and the steering angular speed is less than, or equal to, the angular speed.

10. The apparatus of claim 9, wherein the third ratio is greater than, or equal to, the product of the first ratio and the second ratio, and is less than the first ratio and the second ratio.

11. A method performed by a sensing apparatus for a vehicle, the sensing apparatus including a sensing unit, a calculator and an adjusting unit to implement the method comprising:
sensing, implemented by the sensing unit, at least one out of vehicle speed information, yaw rate information, and steering angle information, and sensing a forward object existing within a predetermined sensing distance;
calculating, implemented by the calculator, at least one of a driving curvature radius, which is calculated based on the vehicle speed information and the yaw rate information, and a steering angular speed, which is calculated based on the steering angle information; and
adjusting, implemented by the adjusting unit, the sensing distance when the driving curvature radius is less than, or equal to, a predetermined curvature radius or the steering angular speed is less than, or equal to, a predetermined angular speed.

12. The method of claim 11, wherein the calculating comprises:
calculating the driving curvature radius when the vehicle speed information is constant during a predetermined period of speed holding time and the yaw rate information is constant during a predetermined period of yaw rate holding time; and
calculating the steering angular speed when the steering angle information is constant during a predetermined period of steering angle holding time.

13. The method of claim 11, wherein the adjusting comprises: restoring the adjusted sensing distance to an existing sensing distance when the driving curvature radius is greater than a predetermined curvature radius or the steering angular speed is greater than a predetermined angular speed during a predetermined period of restoration time.

14. A control apparatus for a vehicle, the apparatus comprising:
a sensing unit that is configured to sense at least one out of vehicle speed information, yaw rate information, and steering angle information, and to sense a forward object existing within a predetermined sensing distance;
a calculator that is configured to calculate at least one out of a driving curvature radius, which is calculated based on the vehicle speed information and the yaw rate information, and a steering angular speed, which is calculated based on the steering angle information;
an adjusting unit that is configured to adjust a threshold distance to be decreased when the driving curvature radius is less than, or equal to, a predetermined curvature radius or the steering angular speed is less than, or equal to, a predetermined angular speed; and a controller that is configured to control a notification device or a brake device when a distance to the forward object is less than the threshold distance.

15. The apparatus of claim 14, wherein the calculator is configured to further calculate a lane curvature radius based on the forward object; and the adjusting unit is configured to adjust the threshold distance to be decreased when a difference between the driving curvature radius and the lane curvature radius is within a predetermined limit.

16. The apparatus of claim 14, wherein the sensing unit is configured to further sense parking-on-shoulder permission information; and the adjusting unit is configured to adjust the threshold distance to be decreased when the parking-on-shoulder permission information is sensed.

17. The apparatus of claim 14, wherein the adjusting unit is configured to restore the adjusted threshold distance to an existing threshold distance when the driving curvature radius is greater than a predetermined curvature radius and the steering angular speed is greater than a predetermined angular speed during a predetermined period of restoration time.

18. The apparatus of claim 14, wherein the adjusting unit is configured to perform:

adjusting the threshold distance by applying a first ratio to the threshold distance when the driving curvature radius is less than, or equal to, the curvature radius and the steering angular speed is greater than the angular speed;

adjusting the threshold distance by applying a second ratio to the threshold distance when the driving curvature radius is greater than the curvature radius and the steering angular speed is less than, or equal to, the angular speed; and adjusting the threshold distance by applying a third ratio to the threshold distance when the driving curvature radius is less than, or equal to, the curvature radius and the steering angular speed is less than, or equal to, the angular speed.

* * * * *